Patented Jan. 1, 1924.

1,479,419

UNITED STATES PATENT OFFICE.

TREADWAY B. MUNROE, OF CHICAGO, ILLINOIS, ASSIGNOR TO C. F. DAHLBERG, OF MINNEAPOLIS, MINNESOTA.

METHOD OF PRESERVING BAGASSE FIBERS AND A BALE THEREOF.

No Drawing. Application filed August 12, 1921, Serial No. 491,750. Renewed February 5, 1923.

*To all whom it may concern:*

Be it known that I, TREADWAY B. MUNROE, a citizen of the United States, residing at Chicago, in the county of Cook and State of Illinois, have invented certain new and useful Improvements in Methods of Preserving Bagasse Fibers and a Bale Thereof; and I do hereby declare the following to be a full, clear, and exact description of the invention, such as will enable others skilled in the art to which it appertains to make and use the same.

This invention relates to a method of preserving and partially preparing bagasse fibers for pulp making purposes, and has for its object to provide a process which will be simple to apply and more efficient in use than those heretofore proposed.

With these and other objects in view, the invention consists in the novel steps and combinations of steps constituting the process, all as will be more fully hereinafter disclosed and particularly pointed out in the claims.

In order to render this invention clear, it is said: Bagasse fibers as they leave the mill contain considerable quantities of sugar and gummy matters, and as masses of said fibers are usually left out in the weather in hot climates for considerable periods of time, alcoholic and acetic acid fermentations soon set in which go on at the expense of said constituents. After the acetic acid fermentation a continued exposure to the weather will cause what I term a humic acid fermentation or deterioration, which destroys the strength of the fiber.

It is therefore very desirable to prevent these deteriorating actions, before the fibers are cooked, preparatory to making them into the desired heat insulating boards.

In carrying out this invention, I place on the interior of a mass of bagasse fibers a substance which will not only prevent the above mentioned fermentations, but will react with the liquid constituents present in the bagasse mass to generate a sufficient heat to partially cook the mass while preserving the same. Such a substance may be caustic lime, or CaO in the dry state. This calcium oxide is conveniently sprinkled on the bagasse while spread out, and the mass is then passed into a baling press, subjected to pressure and bound into bales.

Any fermentation that may occur in those portions not reached by the caustic lime will give rise to heat and a liquid, and in those portions of the mass occupied by said lime, the latter will be hydrated by the liquid present. This will give rise to more heat on the interior of the mass. The baling action will form substantially air and liquid proof layers of compacted fibers on the exterior of the bale through which very little air will enter to the interior, and very little heat will escape to the exterior.

The result is a semi-cooking solution on the interior of the mass which is held therein by the said exterior layers whose fibers are cemented together by the sugar and gummy matters present. When said bale is opened preparatory to subjecting its fibers to the regular cooking action before forming them into a finished board, these baled fibers are found to possess not only their full strength free from all deteriorating influences, but to be in a partially cooked or softened state, so that the normal cooking thereof is greatly facilitated or even obviated.

What I claim is:

1. The process of preventing the natural deterioration, for pulp making purposes, of a mass of bagasse fibers while softening the same, which consists in applying to the interior of said mass a heat generating compound in a quantity sufficient to soften said fibers; and forming said mass into a bale under pressure, substantially as described.

2. The process of preserving and softening a mass of bagasse fibers containing moisture which consists in applying dry lime to the interior of said mass; and baling the lime containing mass under pressure, substantially as described.

3. The process of preserving and softening a mass of bagasse fibers containing moisture which consists in applying dry caustic lime to the interior of said mass in quantities sufficient to soften said fibers; baling said lime containing mass under pressure; and holding said fibers in their baled condition until said fibers are appreciably softened, substantially as described.

4. A baled mass of bagasse fibers having caustic lime on its interior, substantially as described.

5. A baled mass of bagasse fibers, the interior of which consists of partially softened fibers, and the exterior of which is provided with a layer of compacted substantially air impervious layers, substantially as described.

6. The process of preventing the natural deterioration for pulp making purposes of a mass of bagasse fibers while softening the same, in applying to the interior of said mass a heat generating compound including lime in a quantity sufficient to soften said fibers; and forming said mass into a bale under pressure, substantially as described.

7. The process of preserving and softening a mass of bagasse fibers containing moisture which consists in applying dry lime to the interior of said mass; said quantity being sufficient to soften said fibers; and baling the lime containing mass under pressure, substantially as described.

In testimony whereof I affix my signature.

TREADWAY B. MUNROE.